US012634988B2

(12) United States Patent
Stefanatos et al.

(10) Patent No.: US 12,634,988 B2
(45) Date of Patent: May 19, 2026

(54) LIMITING SPATIAL RANGE OF CHANNEL OCCUPANCY SHARING IN UNLICENSED SPECTRUM VIA HOP COUNTING

(71) Applicant: QUALCOMM Incorporated, San Diego, CA (US)

(72) Inventors: Stelios Stefanatos, San Diego, CA (US); Shuanshuan Wu, San Diego, CA (US); Arthur Gubeskys, San Diego, CA (US); Parisa Cheraghi, Cambridge (GB); Chang-Sik Choi, Seoul (KR); Kapil Gulati, Belle Mead, NJ (US)

(73) Assignee: Qualcomm Incorporated, San Diego, CA (US)

( * ) Notice: Subject to any disclaimer, the term of this patent is extended or adjusted under 35 U.S.C. 154(b) by 584 days.

(21) Appl. No.: 18/004,779

(22) PCT Filed: Jul. 15, 2021

(86) PCT No.: PCT/US2021/070884

§ 371 (c)(1),
(2) Date: Jan. 9, 2023

(87) PCT Pub. No.: WO2022/040650

PCT Pub. Date: Feb. 24, 2022

(65) Prior Publication Data

US 2023/0262756 A1     Aug. 17, 2023

(30) Foreign Application Priority Data

Aug. 18, 2020    (GR) ............................. 20200100490

(51) Int. Cl.
*H04W 74/0808*     (2024.01)

(52) U.S. Cl.
CPC ............................. *H04W 74/0808* (2013.01)

(58) Field of Classification Search
CPC .................................................. H04W 74/0808
See application file for complete search history.

(56) References Cited

U.S. PATENT DOCUMENTS 10,798,602 B2    10/2020   Yerramalli et al.
2019/0173612 A1*   6/2019   Kimura ................. H04L 1/0063
(Continued)

FOREIGN PATENT DOCUMENTS

CN       110784874 A    2/2020
EP       3817428 A1    5/2021
(Continued)

OTHER PUBLICATIONS

CATT: "Congestion Control for NR SL", 3GPP Draft, R2-1914453, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816535, pp. 1-3, Sections 2 to 2.2.
(Continued)

*Primary Examiner* — James P Duffy
(74) *Attorney, Agent, or Firm* — Harrity & Harrity, LLP

(57) ABSTRACT

Various aspects of the present disclosure generally relate to wireless communication. In some aspects, a user equipment may receive information identifying a shared channel occupancy for a packet transmission resource and a hop counter value associated with the shared channel occupancy. The user equipment may determine whether to transmit one or more packets in the shared channel occupancy based at least in part on the hop counter value associated with the shared channel occupancy. Numerous other aspects are provided.

30 Claims, 10 Drawing Sheets

600 ➞

(56) References Cited

U.S. PATENT DOCUMENTS

| 2019/0394786 A1 | 12/2019 | Parron et al. |
| 2020/0107336 A1 | 4/2020 | Yang et al. |
| 2024/0137745 A1* | 4/2024 | Lu ........................ H04W 40/22 |

FOREIGN PATENT DOCUMENTS

| WO | 2019027928 | 2/2019 |
| WO | 2020024854 A1 | 2/2020 |

OTHER PUBLICATIONS

International Search Report and Written Opinion—PCT/US2021/070884—ISA/EPO—Nov. 17, 2021.
3GPP: "3rd Generation Partnership Project, Technical Specification Group Radio Access Network, Study on NR-based Access to Unlicensed Spectrum, (Release 16)", TR 38.889 V1.1.0, Dec. 11, 2018, pp. 1-119.

* cited by examiner

1010 — Receive information identifying a shared channel occupancy for a packet transmission resource and a hop counter value associated with the shared channel occupancy 1020 — Determine whether to transmit one or more packets in the shared channel occupancy based at least in part on the hop counter value associated with the shared channel occupancy

1000

LIMITING SPATIAL RANGE OF CHANNEL OCCUPANCY SHARING IN UNLICENSED SPECTRUM VIA HOP COUNTING

CROSS-REFERENCE TO RELATED APPLICATIONS

This Patent Application is a 371 national stage of PCT Application No. PCT/US2021/070884 filed on Jul. 15, 2021, entitled "LIMITING SPATIAL RANGE OF CHANNEL OCCUPANCY SHARING IN UNLICENSED SPECTRUM VIA HOP COUNTING." which claims priority to Greece Patent Application Serial No. 20200100490, filed on Aug. 18, 2020, entitled "LIMITING SPATIAL RANGE OF CHANNEL OCCUPANCY SHARING IN UNLICENSED SPECTRUM VIA HOP COUNTING." The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses for limiting spatial range of channel occupancy sharing in unlicensed spectrum via hop counting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: receiving information identifying a shared channel occupancy for a packet transmission resource and a hop counter value associated with the shared channel occupancy; and determining whether to transmit one or more packets in the shared channel occupancy based at least in part on the hop counter value associated with the shared channel occupancy.

In some aspects, a UE for wireless communication includes: a memory; and one or more processors coupled to the memory, the memory and the one or more processors configured to: receive information identifying a shared channel occupancy for a packet transmission resource and a hop counter value associated with the shared channel occupancy; and determine whether to transmit one or more packets in the shared channel occupancy based at least in part on the hop counter value associated with the shared channel occupancy.

In some aspects, a non-transitory computer-readable medium storing a set of instructions for wireless communication includes: one or more instructions that, when executed by one or more processors of a user equipment, cause the user equipment to: receive information identifying a shared channel occupancy for a packet transmission resource and a hop counter value associated with the shared channel occupancy; and determine whether to transmit one or more packets in the shared channel occupancy based at least in part on the hop counter value associated with the shared channel occupancy.

In some aspects, an apparatus for wireless communication includes: means for receiving information identifying a shared channel occupancy for a packet transmission resource and a hop counter value associated with the shared channel occupancy; and means for determining whether to transmit one or more packets in the shared channel occupancy based at least in part on the hop counter value associated with the shared channel occupancy.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
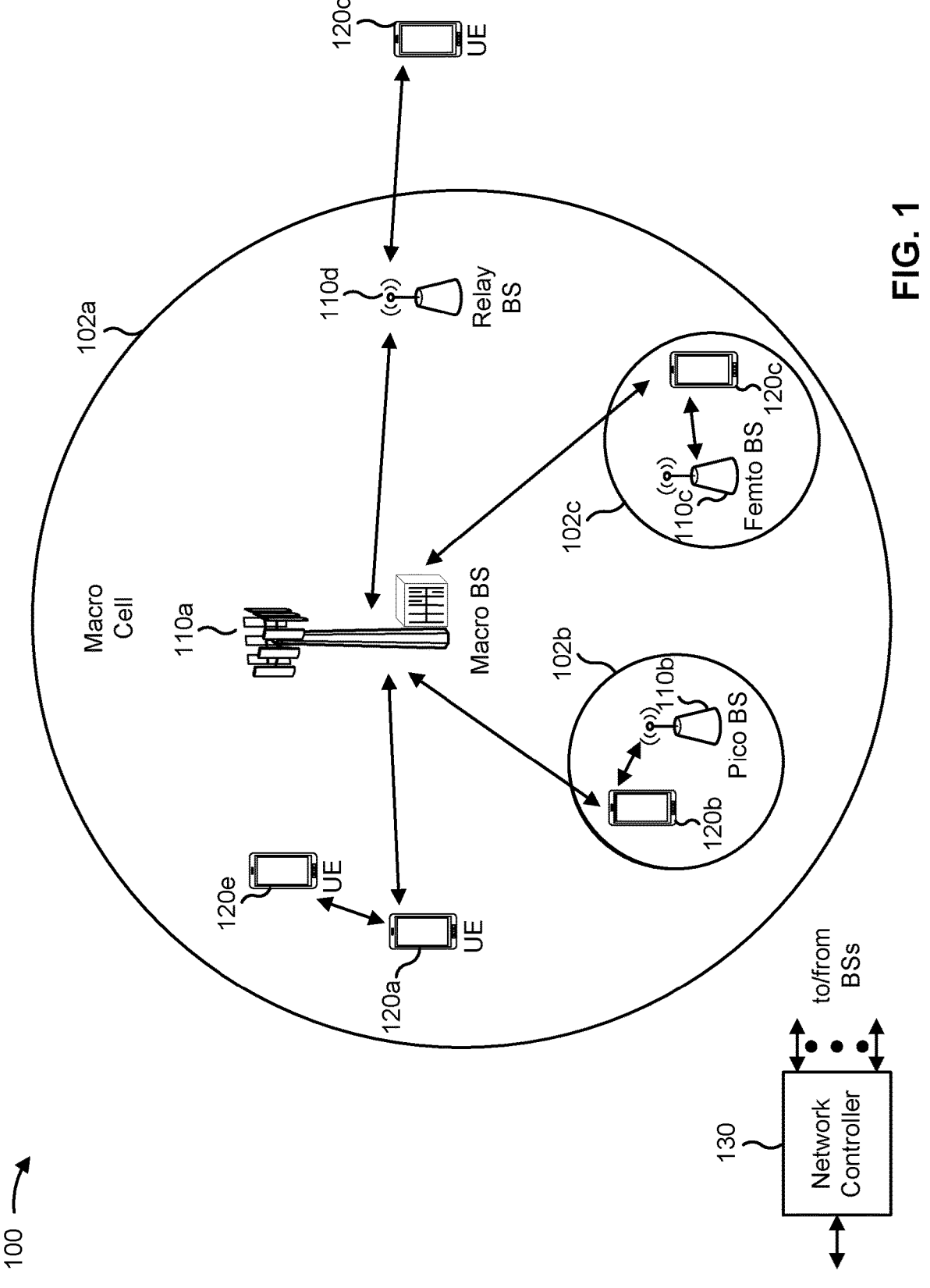
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
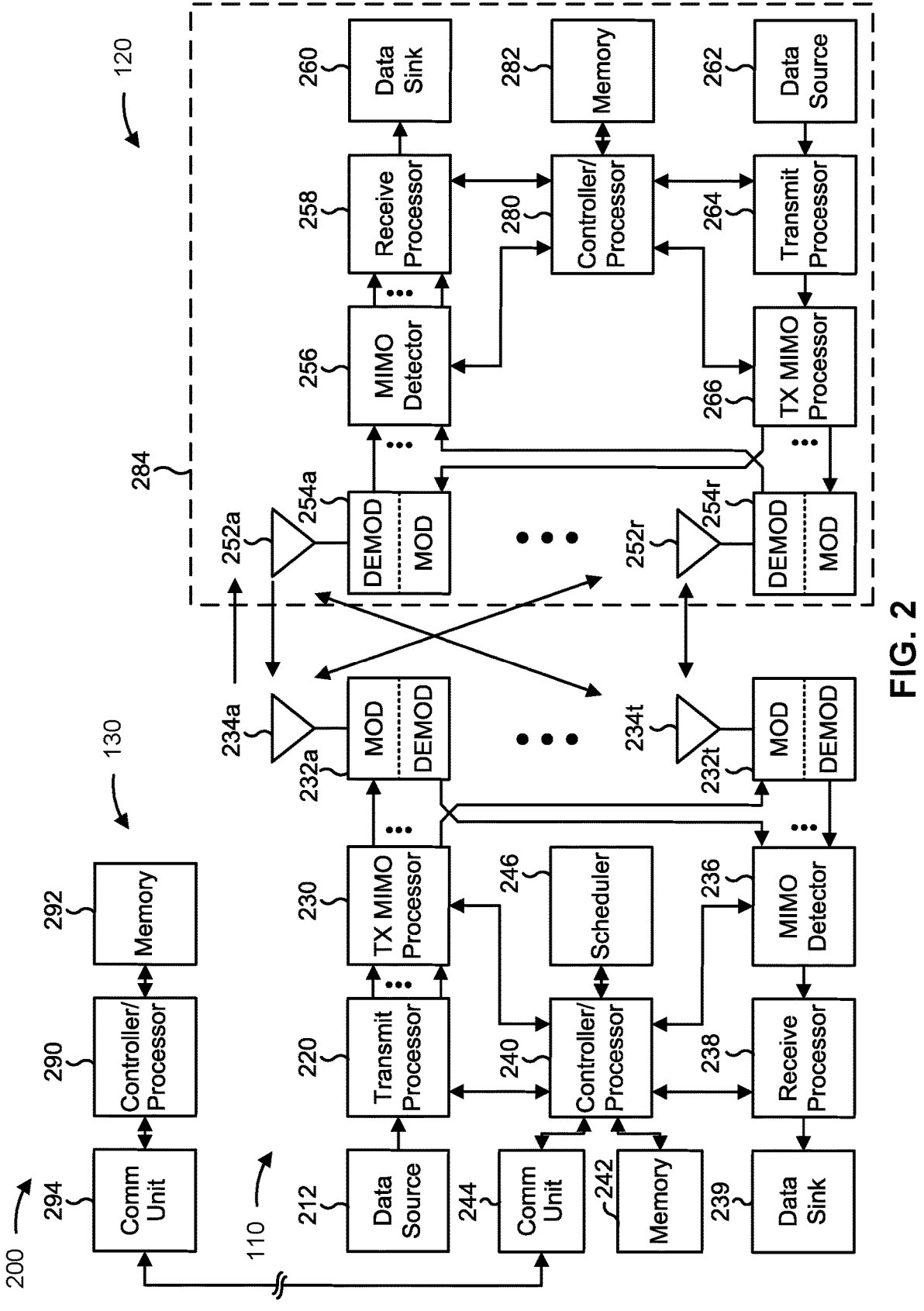
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with limiting spatial range of channel occupancy sharing in unlicensed spectrum via hop counting, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, UE 120 may include means for receiving information identifying a shared channel occupancy for a packet transmission resource and a hop counter value associated with the shared channel occupancy; and/or means for determining whether to transmit one or more packets in the shared channel occupancy based at least in part on the hop counter value associated with the shared channel occupancy. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
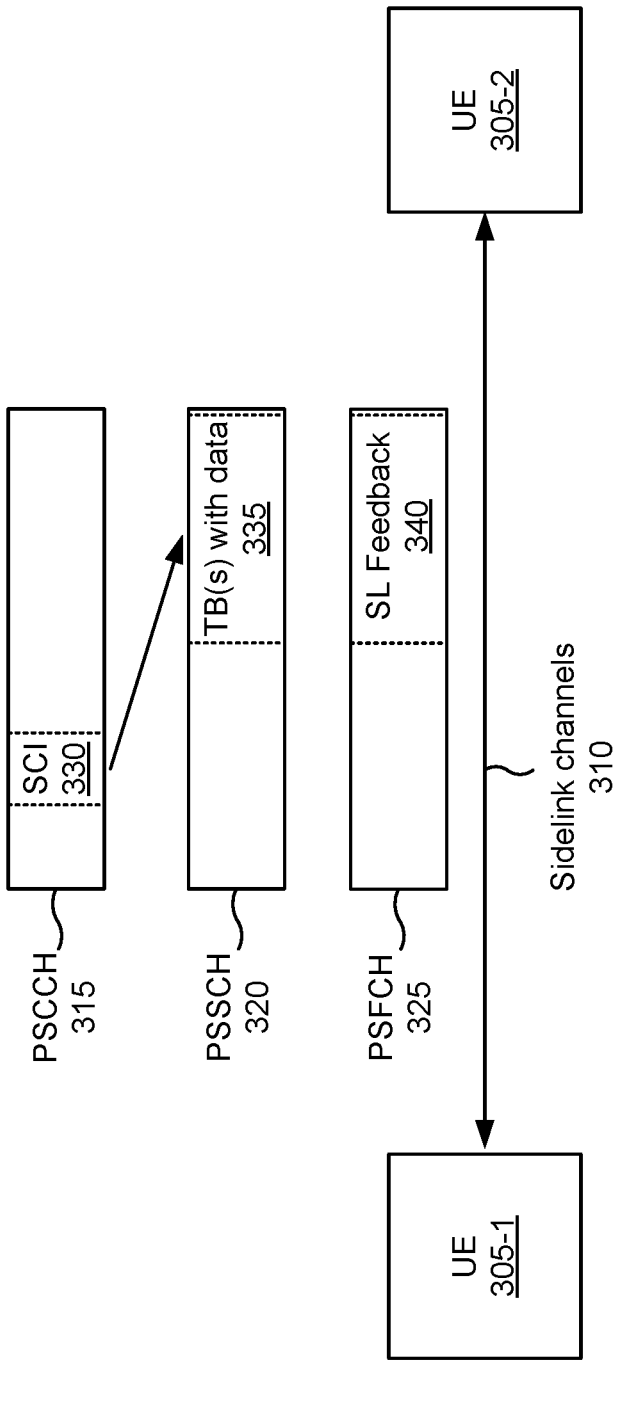
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications,), mesh networking, or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel The PSSCH 320 may be used to communicate data, similar to a physical downlink shared channel (PDSCH) and/or a physical uplink shared channel (PUSCH) used for cellular communications with a base station 110 via an access link or an access channel For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
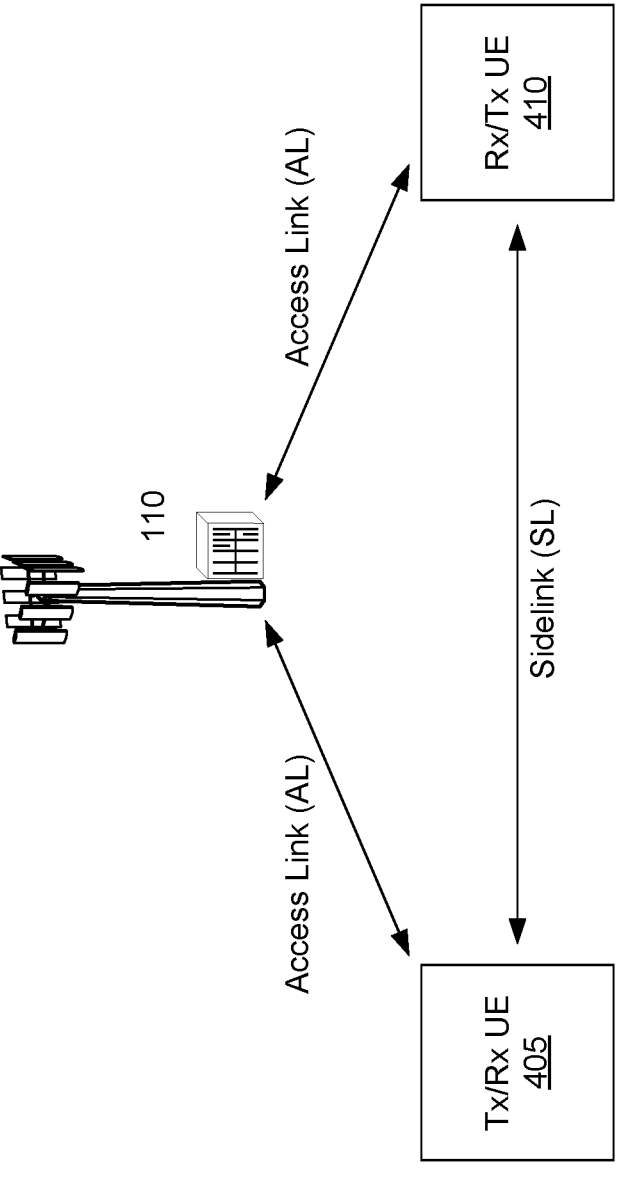
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In some communications systems, such as when unlicensed spectrum and Wi-Fi or other technologies are co-located in a common area using common communication resources (e.g., sharing the unlicensed spectrum), UEs may use channel sensing procedures to determine whether resources in a channel are available for communication. For example, a UE may perform a listen-before-talk (LBT) procedure to determine whether there is an ongoing transmission by another UE or another device using a particular transmission opportunity. In an LBT procedure, the UE may perform channel sensing to determine whether a channel is associated with less than a threshold level of energy, to determine whether the UE can transmit on the channel without interfering with other communications. If the UE determines that a channel is available for channel occupancy (e.g., after performing a successful LBT procedure), the UE may determine a channel occupancy time (COT) for the channel The UE may then immediately proceed to transmit and may do so in a continuous fashion that can be no longer than a maximum COT (e.g., whose value may be defined by regulation).

A channel occupancy may include resources spanning a plurality of slots (e.g., 4 or 20 slots, depending on the maximum COT and the slot duration) and including one or more resource blocks and/or frequency resources in each slot. A UE may initiate channel occupancy for a COT using a channel sensing procedure, such as LBT (for example, a Type-1 channel access procedure). Other UEs may decode information regarding the channel occupancy and proceed in transmitting packets anytime within the COT, either without performing LBT or by first performing a "light" (e.g., deterministic duration) LBT (for example, a Type-2 channel access procedure). However, in some communication systems, such as in communication systems enabling V2X communication, the sharing of the channel occupancy may result in a UE proceeding to transmit using the channel occupancy without realizing the existence of local channel activity that would have prevented the UE from transmitting if the UE had performed a full duration, Type-1 LBT.

Figure 5:
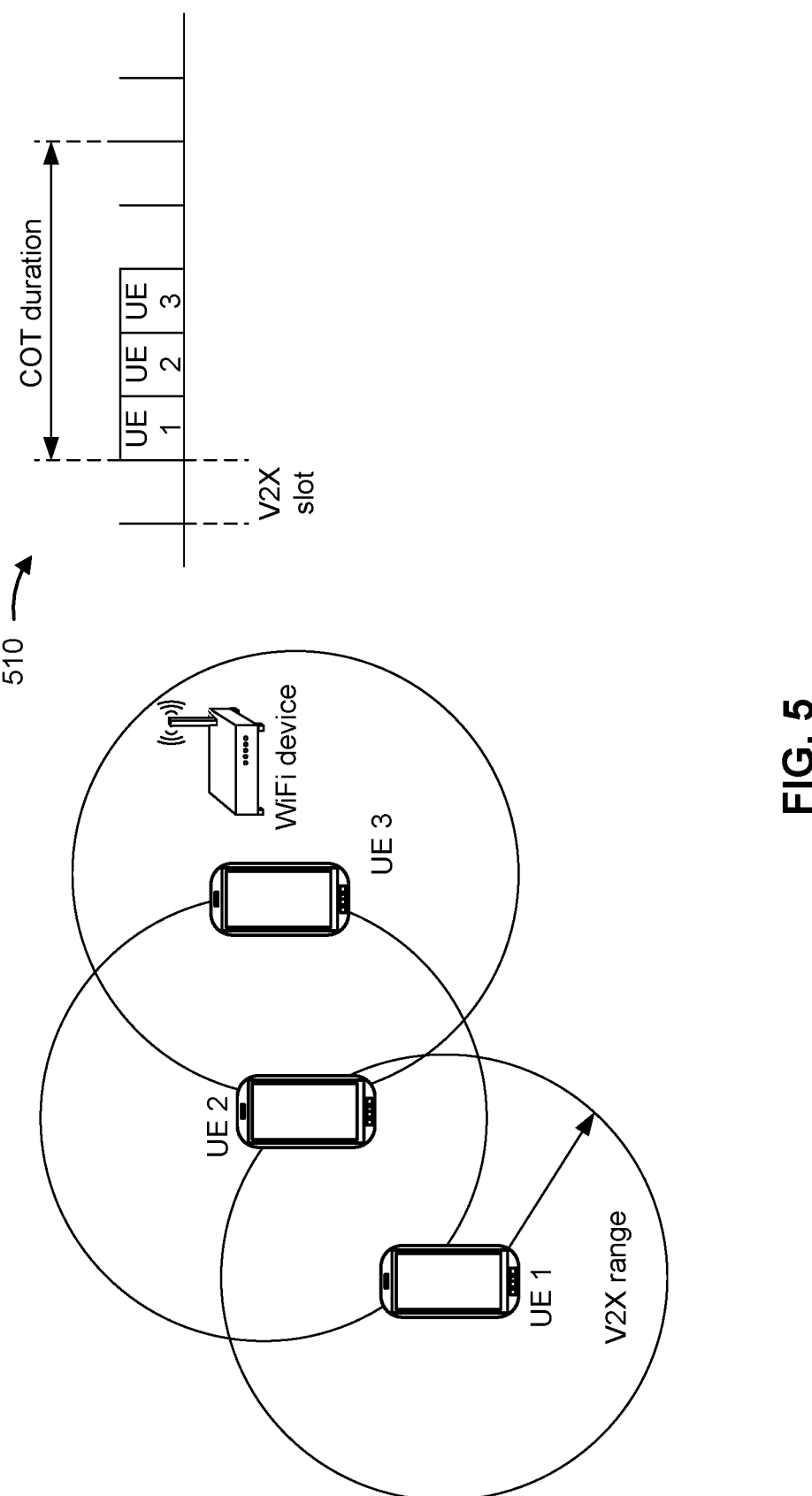
FIG. 5 is a diagram illustrating an example of channel occupancy sharing for sidelink communication in unlicensed spectrum, in accordance with the present disclosure.

FIG. 5 is a diagram illustrating an example 500 of channel occupancy sharing for sidelink communication in unlicensed spectrum, in accordance with the present disclosure.

As shown in FIG. 5, a first UE (UE 1), a second UE (UE 2), and a third UE (UE 3) may communicate via V2X communication. UE 1 may perform a channel sensing procedure, such as LBT (e.g., a Type-1 channel access procedure), to determine that a channel in the unlicensed spectrum is interference free, and initiate a channel occupancy 510 with an associated COT that spans a plurality of slots. UE 1 may transmit a packet in the first slot of the channel occupancy 510. UE 2 may be within a V2X range of UE 1. UE 2 may decode a transmission of SCI from UE 1 and obtain information regarding the channel occupancy 510. UE 2 may determine that the COT is currently active and transmit a packet in a second slot of the channel occupancy 510. In this case, UE 2 may share resources of the channel occupancy with UE 1 without causing interference. UE 2 may also transmit SCI including the information regarding the channel occupancy 510 to propagate the information regarding the channel occupancy 510 to other UEs.

UE 3 may be outside of the V2X range of UE 1, but within the V2X range of UE 2. UE 3 may decode the SCI transmission from UE 2 and obtain the information regarding the channel occupancy 510. UE 3 may determine that the COT is currently active and transmit a packet in a third slot of the channel occupancy 510. However, by skipping the channel sensing procedure, such as LBT procedure (e.g., Type-1 channel access procedure), UE 3 may interfere with a WiFi device within the V2X range of UE 3. In this case, UE 3 may be sufficiently far from UE 1 that a reservation of resources for the channel occupancy 510 by UE 1 is not applicable to UE 3. In other words, UE 1 may determine that a particular resource is available in its area, but UE 3 may be subject to interference, in the particular resource, that was undetectable to UE 1 (e.g., from the WiFi device or another device far enough from UE 1 as to avoid interference with UE 1, but close enough to UE 3 to cause interference with UE 3).

As described above, when a UE that uses a shared channel occupancy is far away from a UE that initiated the shared channel occupancy, the UE using the shared channel occupancy may encounter interference activity that is not detected by the LBT procedure performed by the UE that initiated the shared channel occupancy. It is possible for UEs to propagate location information, such as a zone identifier (ID), of the UE that initiated the shared channel occupancy and to prevent a UE from using the shared channel occupancy if the UE is more than a certain distance away from the UE that initiated the shared channel occupancy. However, propagating distance information of the UE that initiated the shared channel occupancy increases signaling overhead for the sidelink control channel For example, propagating the zone ID of the UE that initiated the shared channel occupancy may consume an additional overhead of 12 bits for the sidelink control channel This may cause a decrease in network speed and consume computing resources (e.g., processing resources, memory resources, and/or communication resources), networking resources, or the like. In addition, location information (e.g., zone ID) of the UE that initiated the shared channel occupancy may not be available, for example, if the UE that initiated the shared channel occupancy is out of global positioning system (GPS) coverage.

Some aspects described herein enable the spatial range of a shared channel occupancy to be controlled using a hop counter value. A UE may receive a hop counter value associated with a shared channel occupancy and may determine whether to transmit in the shared channel occupancy based at least in part on the hop counter value. In some aspects, the hop counter value may indicate a number of hops from a first UE that initiated the shared channel resource. In this case, the UE may avoid transmitting in the shared channel occupancy based at least in part on the number of hops between the UE and the first UE that initiated the shared channel occupancy. This may reduce interference caused by utilization of the shared channel occupancy by a UE that is far away from the UE that initiated the shared channel occupancy. Further, propagating the hop counter value utilizes less overhead in the sidelink control channel than propagating location information of the UE that initiated the shared channel occupancy. This may cause an increase in network speed and conserve computing resources (e.g., processing resources, memory resources, and/or communication resources), networking resources, or the like that may otherwise be consumed by propagating the location information of the UE that initiated the shared channel occupancy. In addition, the hop counter value does not require location information, and can be used when location information (e.g., GPS information) of the UE that initiated the shared channel occupancy is unavailable.

As indicated above, FIG. 5 is provided as an example. Other examples may differ from what is described with respect to FIG. 5.

Figure 6:
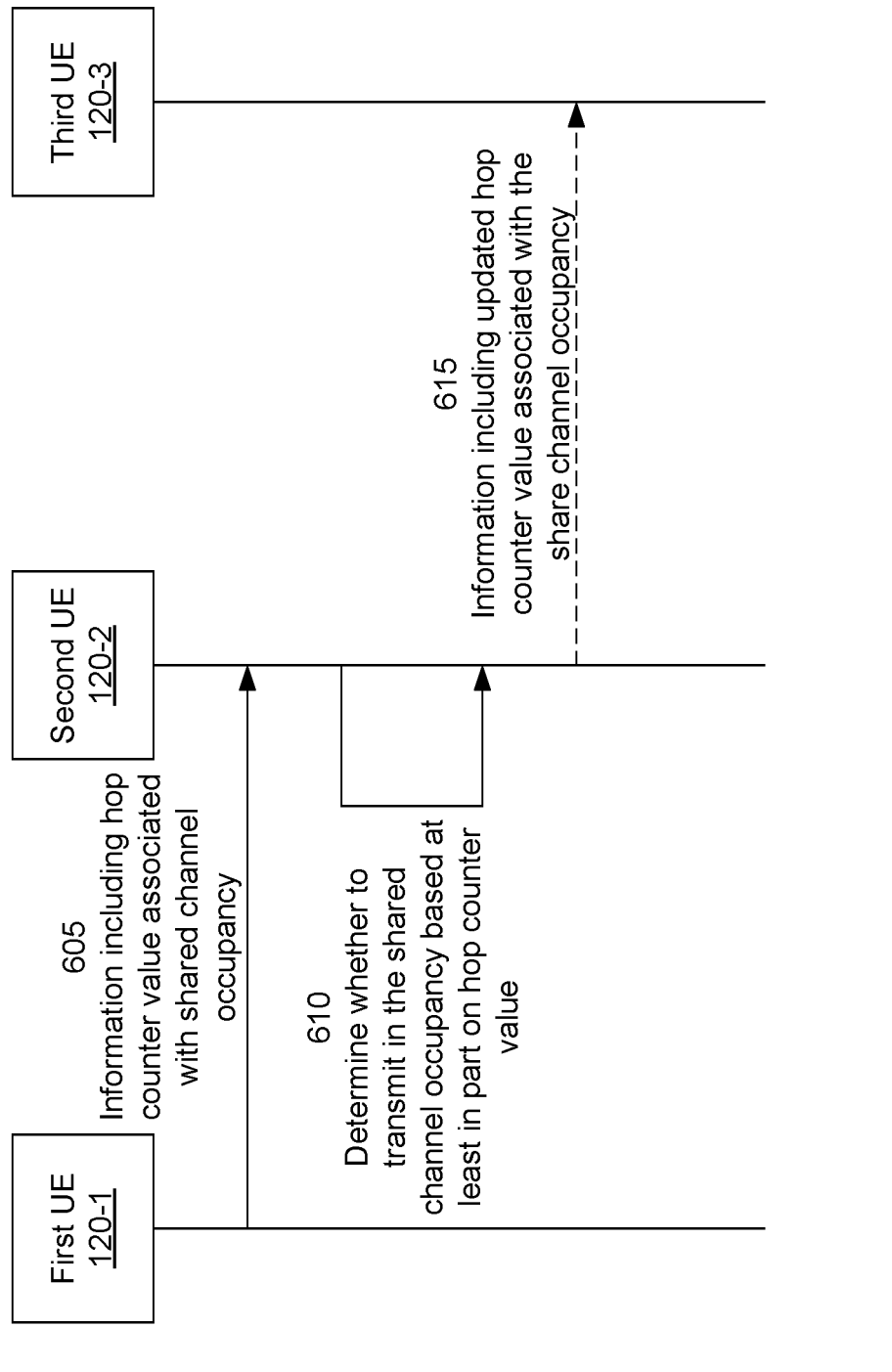
FIGS. 6-9 are diagrams illustrating examples associated with limiting spatial range of channel occupancy sharing in unlicensed spectrum via hop counting, in accordance with the present disclosure.

FIG. 6 is a diagram illustrating an example 600 associated with limiting spatial range of channel occupancy sharing in unlicensed spectrum via hop counting, in accordance with the present disclosure. As shown in FIG. 6, example 600 includes communication between a first UE 120-1, second UE 120-2, and a third UE 120-3. In some aspects, the first UE 120-1, the second UE 120-2, and the third UE 120-3 may be included in a wireless network, such as wireless network 100. The first UE 120-1, the second UE 120-2, and the third UE 120-3 may communicate via one or more sidelink channels as described elsewhere herein, such as the sidelink communications described with respect to the UEs 305-1 and 305-2.

As shown in FIG. 6, and by reference number 605, the second UE 120-2 may receive, from the first UE 120-1, information identifying a shared channel occupancy and including a hop counter value associated with the shared channel occupancy. The information may be included in a sidelink transmission received by the second UE 120-2 from the first UE 120-1. For example, the information may be included in SCI (e.g., first stage SCI or second stage SCI) transmitted by the first UE 120-1. The first UE 120-1 may transmit the SCI in a PSSCH communication, such that any UE (e.g., the second UE 120-2) within a range of the first UE 120-1 may receive and decode the SCI.

The information (e.g., SCI) transmitted by the first UE 120-1 may identify the shared channel occupancy and a COT associated with the shared channel occupancy. When the second UE 120-2 has data for transmission, the second UE 120-2 may decode the information (e.g., SCI) transmitted by the first UE 120-1 and determine that the shared channel occupancy has been initiated and determine the COT associated with the shared channel occupancy. In some aspects, the shared channel occupancy may include packet transmission resources on a channel in an unlicensed spectrum. The COT associated with the shared channel occupancy may span a plurality of slots (e.g., 4-20 slots). In some aspects, the first UE 120-1 may be the UE that initiated the shared channel resource (referred to herein as the "COT-initiating UE"). In some aspects, the first UE 120-1 may not be the COT-initiating UE, but may transmit the information identifying the shared channel occupancy to propagate the shared channel occupancy to one or more UEs (e.g., the second UE 120-2) within the range of the first UE 120-1.

The information received by the second UE 120-2 may include the hop counter value associated with the shared channel occupancy. For example, the SCI may include a hop counter field that indicates that hop counter value. In some aspects, the hop counter value, included in the information received from the first UE 120-1, indicates a number of hops between the COT-initiating UE and the first UE 120-1. In the case in which the first UE 120-1 is the COT-initiating UE, the hop counter value received from the first UE 120-1 may be 0. The COT-initiating UE may set the hop counter value to 0, and each subsequent UE that decodes and further propagates the information identifying the shared channel occupancy may update the hop counter value by incrementing the hop counter value. For example, if a UE decodes information with a hop counter value equal to x, the UE may increment the hop counter value to x+1.

As further shown in FIG. 6, and by reference number 610, the second UE 120-2 may determine whether to transmit in the shared channel occupancy based at least in part on the hop counter value. The second UE 120-2 may determine whether to transmit one or more packets in the shared channel occupancy based at least in part on a determination of whether the hop counter value satisfies a threshold.

In some aspects, the threshold may correspond to a maximum number of hops from the COT-initiating UE for which a UE may use the shared channel resource. The second UE 120-2 may increment the received hop counter value to determine an updated hop counter value that indicates the number of hops between the COT-initiating UE and the second UE 120-2. For example, if hop counter value received from the first UE 120-1 is equal to x, the updated hop counter value determined by the second UE 120-2 may be x+1. The second UE 120-2 may then compare the updated hop counter value to the threshold to determine whether to transmit one or more packets in the shared channel resource. For example, if the updated hop counter value satisfies the threshold (e.g., the updated hop counter value is less than or equal to the threshold), the second UE 120-2 may transmit one or more packets in the shared channel resource. If the updated hop counter value does not satisfy the threshold (e.g., the updated hop counter value is greater than the threshold), the second UE 120-2 may avoid using the shared channel resource.

In some aspects, the second UE 120-2 may receive information identifying the same shared channel occupancy from multiple UEs (e.g., the first UE 120-1 and one or more other UEs). For example, the second UE 120-2 may decode first SCI identifying the shared channel occupancy and including a first hop counter value from the first UE 120-1 and may decode second SCI identifying the shared channel occupancy including a second hop counter value from another UE. In this case, the second UE 120-2 may use the smaller one of the first hop counter value or the second hop counter value to determine whether to transmit in the shared channel resource. For example, the second UE 120-2 may determine that the received hop counter value (x) is equal to the smaller one of the first hop counter value or the second hop counter value, determine the updated hop counter value (x+1) using the received hop counter value (x), and compare the updated hop counter value (x+1) with the threshold.

The threshold may be set to control a spatial range of the shared channel resource, as a UE with a large hop counter value is more likely to be farther the COT-initiating UE. The overhead of the hop counter field in the SCI may be based at least in part on the threshold ("hop counter threshold") and/or the COT duration. The overhead (in number of bits) of the hop counter field may be determined as $\lceil \log_2\{\min$ (hop counter threshold, COT duration (in # of slots))$\}\rceil$. Accordingly, for an exemplary shared channel occupancy with a COT duration of 10 ms and a slot duration of 0.5 ms (e.g., 20 slots), the overhead for the hop counter field may be less than or equal to 6 bits. The overhead for the hop counter field may be even less for shared channel occupancies with shorter durations (and/or smaller thresholds).

In some aspects, the threshold may be between 0 and the number of slots in the COT. A threshold of 0 would indicate that only the COT-initiating can use the shared channel occupancy. A threshold equal to the number of slots in the COT would indicate that the shared channel occupancy is not restricted by the hop counter value. The threshold value may be based at least in part on the COT duration, NR numerology (e.g., how many slots are included in the COT duration), and/or activity of other technologies (e.g., WiFi devices) in the frequency band. In some aspects, the threshold may be preconfigured, for example, using a table, stored in the second UE 120-2 (and/or one or more other UEs) that maps the COT duration and/or numerology to the threshold value. In some aspects, the threshold may be adaptively computed by a wireless communication device (e.g., base station or UE) in the network and provided to the second UE 120-2 and/or one or more other UEs via signaling (e.g., radio resource control (RRC) signaling, downlink control information (DCI), SCI, and/or a medium access control (MAC) control element (MAC-CE)). In some aspects, the COT initiating UE may set the threshold and provide an indication of the threshold in the information (e.g., SCI) identifying the shared channel occupancy.

As further shown in FIG. 6, and by reference number 615, the second UE 120-2 may transmit information identifying the shared channel occupancy and including the updated hop counter value associated with the shared channel occupancy. As described above, the second UE 120-2 may increment the received hop counter value (x) to determine the updated hop counter value (x+1), and may transmit one or more packets using the shared channel occupancy if the updated hop counter value satisfies the threshold. In this case, the second UE 120-2 may also transmit the information identifying the shared channel occupancy and including the updated hop counter value in order to propagate the information to one or more other UEs. In some aspects, the information may be included in SCI transmitted from the second UE 120-2 (e.g., in a PSCCH communication), such that the information can be received and decoded by one or more other UEs in the range of the second UE 120-2.

As shown in FIG. 6, the third UE 120-3 may receive the information transmitted from the second UE 120-2. The third UE 120-3 may decode the information identifying the shared channel occupancy and including the updated hop counter value. The third UE 120-3 may then determine whether to transmit in the shared channel occupancy based at least in part on the updated hop counter value, as described above in connection with the second UE 120-2.

In some aspects, the second UE 120-2 may determine not to transmit using the shared channel occupancy based at least in part on a determination that the updated hop counter value does not satisfy the threshold. In this case, the second UE 120-2 may not transmit the information identifying the shared channel threshold and including the updated hop counter value. In some aspects, if the second UE 120-2 determines not to transmit in the shared channel occupancy, the second UE 120-2 may initiate a channel sensing procedure (e.g., an LBT procedure) to initiate another channel occupancy.

In some aspects, if the UE determines that the updated hop counter value does not satisfy the threshold, the second UE 120-2 may determine to transmit using the channel occupancy, but with a reduced transmit power to avoid interference with other UEs or devices that may have reserved other channel occupancies. For example, the second UE 120-2 may reduce a transmit power by a preconfigured amount or by an amount defined in a specification.

In some aspects, the second UE 120-2 may determine whether another condition is satisfied in order to determine whether to transmit in the shared channel occupancy. For example, when a reference signal received power (RSRP) of the decoded signal (e.g., the signal including the information identifying the shared channel occupancy) satisfies a RSRP threshold, the second UE 120-2 may transmit one or more packets using the shared channel occupancy despite the updated hop counter value not satisfying the threshold. Additionally, or alternatively, when a priority associated with the one or more packets that second UE 120-2 is to transmit satisfies a priority threshold priority, the second UE 120-2 may transmit the one or more packets using the shared channel occupancy despite the updated hop counter value not satisfying the threshold. Additionally, or alternatively, the second UE 120-2 may determine whether a channel congestion level satisfies a congestion threshold (e.g., whether a measured channel busy ratio (CBR) satisfies a CBR threshold). In this case, when the measured channel congestion is less than the congestion threshold, second UE 120-2 may transmit the one or more packets using the shared channel occupancy despite the updated hop counter value not satisfying the threshold.

As described above in connection with FIG. 6, a UE (e.g., the second UE 120-2) may receive a hop counter value associated with a shared channel occupancy and may determine whether to transmit in the shared channel occupancy based at least in part on the hop counter value. This may reduce interference caused by utilization of the shared channel occupancy by a UE that is far away from the UE that initiated the shared channel occupancy. Further, propagating the hop counter value utilizes less overhead in the sidelink control channel than propagating location information of the COT-initiating UE. This may cause an increase in network speed and conserve computing resources (e.g., processing resources, memory resources, and/or communication resources), networking resources, or the like that may otherwise be consumed by propagating the location information of the COT-initiating UE. In addition, the hop counter value does not require location information, and can be used when location information (e.g., GPS information) of the COT-initiating UE is unavailable.

As indicated above, FIG. 6 is provided as an example. Other examples may differ from what is described with respect to FIG. 6.

Figure 7:
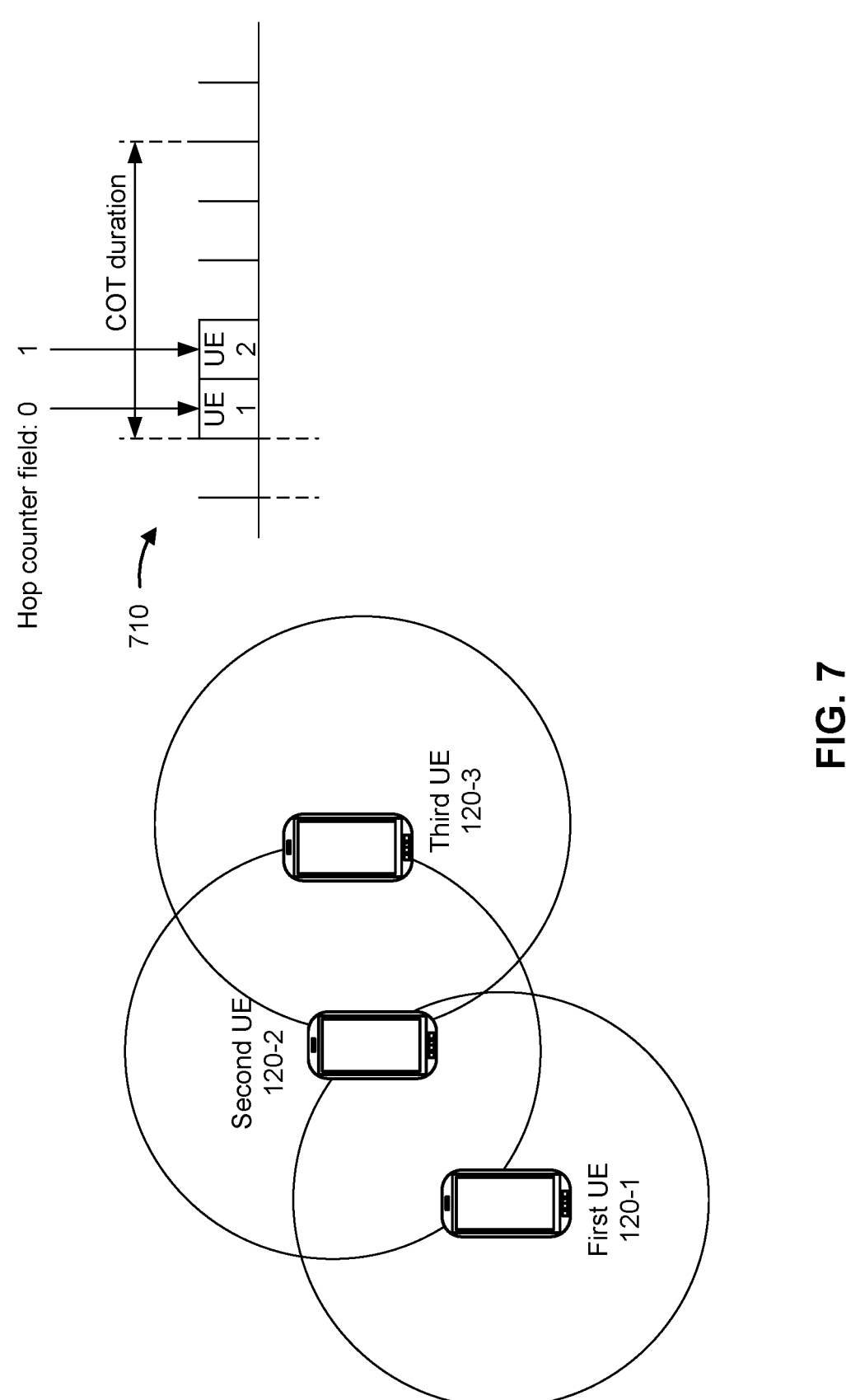

FIG. 7 is a diagram illustrating an example 700 associated with limiting spatial range of channel occupancy sharing in unlicensed spectrum via hop counting, in accordance with the present disclosure. As shown in FIG. 7, example 700 includes communication between a first UE 120-1, second UE 120-2, and a third UE 120-3. The first UE 120-1, the second UE 120-2, and the third UE 120-3 may communicate via one or more sidelink channels as described elsewhere herein, such as the sidelink communications described with respect to the UEs 305-1 and 305-2. For example, the first UE 120-1, the second UE 120-2, and the third UE 120-3 may communicate via a V2X protocol.

In the example 700 of FIG. 7, the hop counter threshold may be set to 1. The first UE 120-1 may be the COT-initiating UE. That is, the first UE 120-1 may perform a channel sensing procedure, such as LBT, to determine that a channel in the unlicensed spectrum is interference free, and initiate a shared channel occupancy 710 with an associated COT that spans a plurality of slots. The first UE 120-1 may transmit a packet in the first slot of the channel occupancy 710. The first UE 120-1 may also transmit information (e.g., SCI) identifying the shared channel occupancy 710 and including the hop counter value of 0.

The second UE 120-2 may be within a transmission range of the first UE 120-1. The second UE 120-2 may receive and decode the transmission, from the first UE 120-1, of the information identifying the shared channel occupancy 710 and including the hop counter value of 0. The second UE 120-2 may increment the hop counter value to determine an updated hop counter value of 1 and may compare the updated hop counter value of 1 to the threshold of 1 to determine whether to transmit in the shared channel occupancy 710. Since the updated hop counter (1) is less than or equal to the threshold (1), the second UE 120-2 may use the shared channel occupancy 710 to transmit one or more packets. For example, the second UE 120-2 may transmit a packet in the second slot of the shared channel occupancy 710. The second UE 120-2 may transmit information (e.g., SCI) identifying the shared channel occupancy 710 and including the hop counter value of 1.

The third UE 120-3 may be within the transmission range of the second UE 120-2, but outside of the transmission range of the first UE 120-1. The third UE 120-3 may receive and decode the transmission, from the second UE 120-2, of the information identifying the shared channel occupancy 710 and including the hop counter value of 1. The third UE 120-3 may increment the hop counter value to determine an updated hop counter value of 2 and may compare the updated hop counter value of 2 to the threshold of 1 to determine whether to transmit in the shared channel occupancy 710. Since the updated hop counter (2) is greater the threshold (1), the third UE 120-3 may determine not to use the shared channel occupancy 710.

As indicated above, FIG. 7 is provided as an example. Other examples may differ from what is described with respect to FIG. 7.

Figure 8:
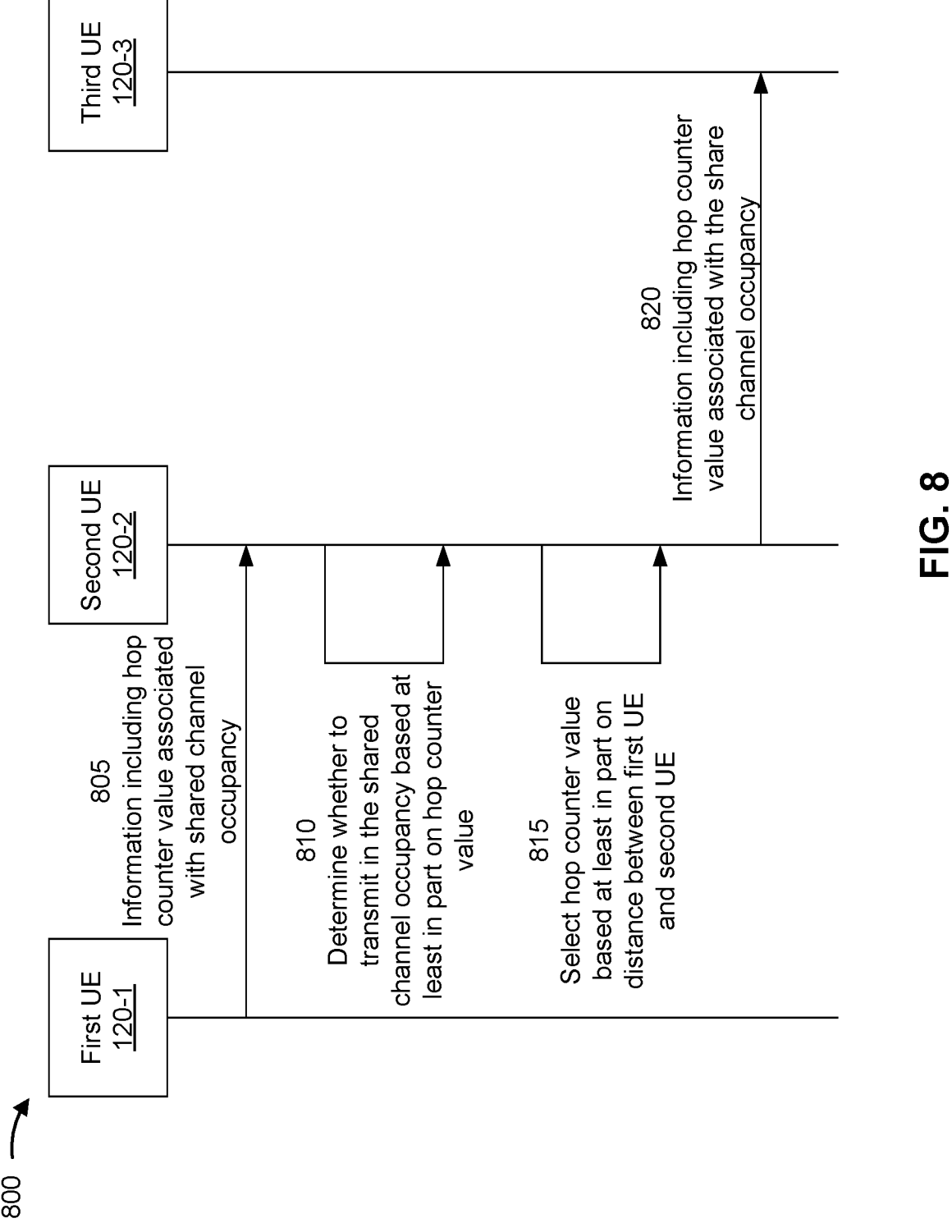

FIG. 8 is a diagram illustrating an example 800 associated with limiting spatial range of channel occupancy sharing in unlicensed spectrum via hop counting, in accordance with the present disclosure. As shown in FIG. 8, example 800 includes communication between a first UE 120-1, second UE 120-2, and a third UE 120-3. In some aspects, the first UE 120-1, the second UE 120-2, and the third UE 120-3 may be included in a wireless network, such as wireless network 100. The first UE 120-1, the second UE 120-2, and the third UE 120-3 may communicate via one or more sidelink channels as described elsewhere herein, such as the sidelink communications described with respect to the UEs 305-1 and 305-2.

As shown in FIG. 8, and by reference number 805, the second UE 120-2 may receive, from the first UE 120-1, information identifying a shared channel occupancy and including a hop counter value associated with the shared channel occupancy. The information may be included in a sidelink transmission received by the second UE 120-2 from the first UE 120-1. For example, the information may be included in SCI (e.g., first stage SCI or second stage SCI) transmitted by the first UE 120-1. The first UE 120-1 may transmit the SCI in a PSSCH communication, such that any UE (e.g., the second UE 120-2) within a range of the first UE 120-1 may receive and decode the SCI. In some aspects, the SCI also includes a field that indicates position information (e.g., a zone ID) of the UE that transmitted the SCI (e.g., the first UE 120-1).

The information (e.g., SCI) transmitted by the first UE 120-1 may identify the shared channel occupancy and a COT associated with the shared channel occupancy. When the second UE 120-2 has data for transmission, the second UE 120-2 may decode the information (e.g., SCI) transmitted by the first UE 120-1 and determine that the shared channel occupancy has been initiated and determine the COT associated with the shared channel occupancy. In some aspects, the shared channel occupancy may include packet transmission resources on a channel in an unlicensed spectrum. The COT associated with the shared channel occupancy may span a plurality of slots (e.g., 4-20 slots). In some aspects, the first UE 120-1 may be the UE that the UE that initiated the shared channel resource (e.g., the COT-initiating UE). In some aspects, the first UE 120-1 may not be the COT-initiating UE, but may transmit the information identifying the shared channel occupancy to propagate the shared channel occupancy to one or more UEs (e.g., the second UE 120-2) within the range of the first UE 120-1.

The information received by the second UE 120-2 may include the hop counter value associated with the shared channel occupancy. For example, the SCI may include a hop counter field that indicates that hop counter value. In some aspects, the hop counter value may be one of a first value (e.g., 0) or a second value (e.g., 1). For example, a hop counter value of 0 may provide an indication that a UE that decodes the information (e.g., the second UE 120-2) is eligible to use the shared channel occupancy, and a hop counter value of 1 may provide an indication that the UE that decodes the information (e.g., the second UE 120-2) is not eligible to use the shared channel occupancy. In this case, only a single bit may be used for the hop counter field in the SCI.

As further shown in FIG. 8, and by reference number 810, the second UE 120-2 may determine whether to transmit in the shared channel occupancy based at least in part on the hop counter value. The second UE 120-2 may determine whether or not to transmit one or more packets in the shared channel occupancy based at least in part on whether the hop counter value received from the first UE 120-1 is the first value (e.g., 0) or the second value (e.g., 1). For example, if the hop counter value is 0, the second UE 120-2 may transmit one or more packets using the shared channel occupancy. If the hop counter value is 1, the second UE 120-2 may determine not to transmit one or more packets using the shared channel occupancy.

As further shown in FIG. 8, and by reference number 815, when the second UE 120-2 determines to transmit one or more packets in the shared resource occupancy, the second UE 120-2 may select a hop counter value based at least in part a distance between the second UE 120-2 and the first UE 120-1. The second UE 120-2 may select one of the first value (e.g., 0) or the second value (e.g., 1) for the hop counter value based on the distance between the second UE 120-2 and the UE from which the information identifying the shared channel occupancy is received (e.g., the first UE 120-1).

The COT-initiating UE may set the hop counter value to 0. A UE (e.g., the second UE 120-2) that decodes the information (e.g., SCI) including the hop counter value of 0) may determine a distance between that UE (e.g., the second UE 120-2) and a transmitting UE (e.g., the first UE 120-1) from which the information (e.g., SCI) is received based on position information associated with the transmitting UE (e.g., the first UE 120-1) included in the information (e.g., SCI). For example, the position information may include a zone ID of the transmitting UE (e.g., the first UE 120-1). In some aspects, this position information may be included as part of a standard SCI field, and therefore, may not add to the overhead associated with the SCI. The UE (e.g., the second UE 120-2) may compare the distance between the UE (e.g., the second UE 120-2) and the transmitting UE (e.g., the first UE 120-1) to a distance threshold to determine whether to set the hop counter value to the first value (e.g., 0) or the second value (e.g., 1). For example, if the distance satisfies the distance threshold (e.g., the distance is less than or equal to the distance threshold), the UE (e.g., the second UE 120-2) may set the hop counter value to 0. If the distance does not satisfy the distance threshold, the UE (e.g., the second UE 120-2) may set the hop counter value to 1. In this case, the hop counter value of 0 may provide an indication that a next UE (e.g., the third UE 120-3) that receives and decodes the information is eligible to use the shared channel occupancy, and the hop counter value of 1 may provide an indication that the next UE (e.g., UE 120-3) that receives and decodes the information is not eligible to use the share channel occupancy.

As further shown in FIG. 8, and by reference number 820, the second UE 120-2 may transmit information identifying the shared channel occupancy and including the updated hop counter value associated with the shared channel occupancy. As described above, when the second UE 120-2 determines to transmit one or more packets using the shared channel occupancy, the second UE 120-2 may set the hop counter value to one of the first value (e.g., 0) or the second value (e.g., 1). In this case, the second UE 120-2 may then transmit the information identifying the shared channel occupancy and including the hop counter value that is set to the first value (e.g., 0) or the second value (e.g., 1) in order to propagate the information to one or more other UEs. In some aspects, the information may be included in SCI transmitted from the second UE 120-2 (e.g., in a PSCCH communication), such that the information can be received and decoded by one or more other UEs in the range of the second UE 120-2.

As shown in FIG. 8, the third UE 120-3 may receive the information transmitted from the second UE 120-2. The third UE 120-3 may decode the information identifying the shared channel occupancy and including the hop counter value. The third UE 120-3 may then determine whether to transmit in the shared channel occupancy based at least in part on whether hop counter value is set to the first value (e.g., 0) or the second value (e.g., 1).

In some aspects, the second UE 120-2 may determine not to transmit using the shared channel occupancy based at least in part on the hop counter value received in the information transmitted by the first UE 120-1. In this case, the second UE 120-2 may not transmit the information identifying the shared channel threshold and including the updated hop counter value. In some aspects, if the second UE 120-2 determines not to transmit in the shared channel occupancy, the second UE 120-2 may initiate a channel sensing procedure (e.g., an LBT procedure) to initiate another channel occupancy.

In some aspects, if the hop counter value indicates that the second UE 120-2 is not eligible to use the shared channel resource, the second UE 120-2 may determine to transmit using the channel occupancy, but with a reduced transmit power to avoid interference with other UEs or devices that may have reserved other channel occupancies. For example, the second UE 120-2 may reduce a transmit power by a pre-configured amount or by an amount defined in a specification.

In some aspects, the second UE 120-2 may determine whether another condition is satisfied in order to determine whether to transmit in the shared channel occupancy. For example, when a reference signal received power (RSRP) of the decoded signal (e.g., the signal including the information identifying the shared channel occupancy) satisfies a RSRP threshold, the second UE 120-2 may transmit one or more packets using the shared channel occupancy despite the hop counter value indicating that the second UE 120-2 is not eligible to use the shared channel resource. Additionally, or alternatively, when a priority associated with the one or more packets that second UE 120-2 is to transmit satisfies a priority threshold priority, the second UE 120-2 may transmit the one or more packets using the shared channel occupancy despite the hop counter value indicating that the second UE 120-2 is not eligible to use the shared channel resource. Additionally, or alternatively, the second UE 120-2 may determine whether a channel congestion level satisfies a congestion threshold (e.g., whether a measured CBR satisfies a CBR threshold). In this case, when the measured channel congestion is less than the congestion threshold, second UE 120-2 may transmit the one or more packets using the shared channel occupancy despite the hop counter value indicating that the second UE 120-2 is not eligible to use the shared channel resource.

As described above in connection with FIG. 8, a UE (e.g., the second UE 120-2) may receive a hop counter value associated with a shared channel occupancy and may determine whether to transmit in the shared channel occupancy based at least in part on the hop counter value. The hop counter value may provide an indication of whether the UE is eligible to use the shared channel occupancy based at least in part on a distance between previous UEs that propagated the information identifying the shared channel resource. This may reduce interference caused by utilization of the shared channel occupancy by a UE that is far away from the UE that initiated the shared channel occupancy. Further, propagating the hop counter value utilizes less overhead in the sidelink control channel than propagating location information of the COT-initiating UE. This may cause an increase in network speed and conserve computing resources (e.g., processing resources, memory resources, and/or communication resources), networking resources, or the like that may otherwise be consumed by propagating the location information of the COT-initiating UE.

As indicated above, FIG. 8 is provided as an example. Other examples may differ from what is described with respect to FIG. 8.

Figure 9:
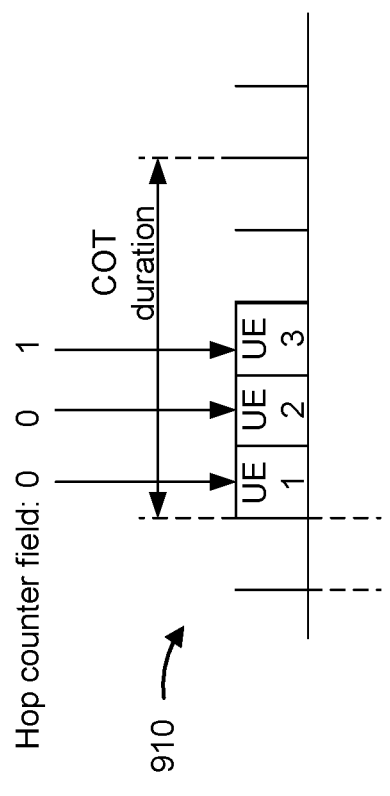
Figure 9:
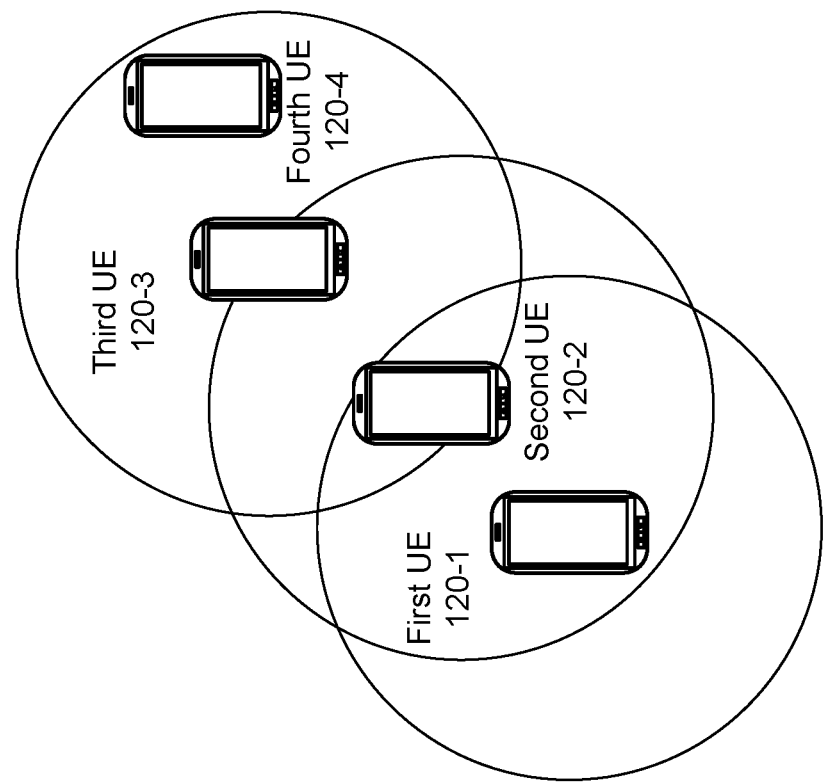

FIG. 9 is a diagram illustrating an example 900 associated with limiting spatial range of channel occupancy sharing in unlicensed spectrum via hop counting, in accordance with the present disclosure. As shown in FIG. 9, example 900 includes communication between a first UE 120-1, second UE 120-2, a third UE, 120-3, and a fourth UE 120-4. The first UE 120-1, the second UE 120-2, the third UE 120-3, and the fourth UE 120-4 may communicate via one or more sidelink channels as described elsewhere herein, such as the sidelink communications described with respect to the UEs 305-1 and 305-2. For example, the first UE 120-1, the second UE 120-2, the third UE 120-3, and the fourth UE 120-4 may communicate via a V2X protocol.

In the example 900 of FIG. 9, the first UE 120-1 may be the COT-initiating UE. That is, the first UE 120-1 may perform a channel sensing procedure, such as LBT, to determine that a channel in the unlicensed spectrum is interference free, and initiate a shared channel occupancy 910 with an associated COT that spans a plurality of slots. The first UE 120-1 may transmit a packet in the first slot of the channel occupancy 710. The first UE 120-1 may set the hop counter value to 0 and transmit information (e.g., SCI) identifying the shared channel occupancy 910 and including the hop counter value of 0.

The second UE 120-2 may be within a transmission range of the first UE 120-1. The second UE 120-2 may receive and decode the transmission, from the first UE 120-1, of the information identifying the shared channel occupancy 910 and including the hop counter value of 0. The second UE 120-2 may transmit one or more packets using the shared channel occupancy 910 based at least in part on receiving the hop counter value of 0. For example, the second UE 120-2 may transmit a packet in the second slot of the shared channel occupancy 910. The second UE 120-2 may determine a distance between the second UE 120-2 and the first UE 120-1 and compare the distance to a distance threshold. The second UE 120-2 may set the hop counter value to 0 based at least in part on a determination that the distance between the second UE 120-2 and the first UE 120-1 satisfies (e.g., is less than or equal to) the distance threshold. The second UE 120-2 may transmit information (e.g., SCI) identifying the shared channel occupancy 910 and including the hop counter value of 0.

The third UE 120-3 may be within the transmission range of the second UE 120-2, but outside of the transmission range of the first UE 120-1. The third UE 120-3 may receive and decode the transmission, from the second UE 120-2, of the information identifying the shared channel occupancy 910 and including the hop counter value of 0. The third UE 120-3 may transmit one or more packets using the shared channel occupancy 910 based at least in part on receiving the hop counter value of 0. For example, the third UE 120-3 may transmit a packet in the third slot of the shared channel occupancy 910. The third UE 120-3 may determine a distance between the third UE 120-3 and the second UE 120-2 and compare the distance to a distance threshold. The third UE 120-3 may set the hop counter value to 1 based at least in part on a determination that the distance between the third UE 120-3 and the second UE 120-2 does not satisfy (e.g., is greater than) the distance threshold. The third UE 120-3 may transmit information (e.g., SCI) identifying the shared channel occupancy 910 and including the hop counter value of 1.

The fourth UE 120-4 may be within the transmission range of the third UE 120-3, but outside of the transmission range of the first UE 120-1 and the second UE 120-2. The fourth UE 120-4 may receive and decode the transmission, from the third UE 120-3, of the information identifying the shared channel occupancy 910 and including the hop counter value of 1. The fourth UE 120-4 may determine not to transmit one or more packets using the shared channel occupancy 910 based at least in part on receiving the hop counter value of 1.

As indicated above, FIG. 9 is provided as an example. Other examples may differ from what is described with respect to FIG. 9.

Figure 10:
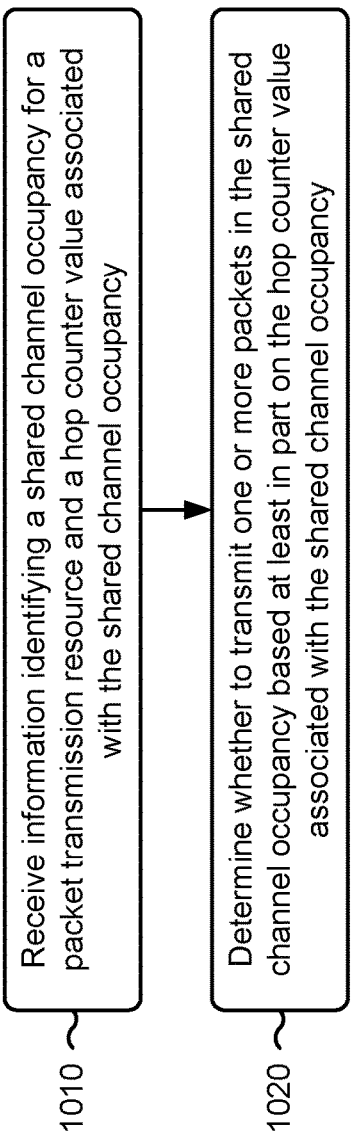
FIG. 10 is a diagram illustrating an example process associated with limiting spatial range of channel occupancy sharing in unlicensed spectrum via hop counting, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with limiting spatial range of channel occupancy sharing in unlicensed spectrum via hop counting.

As shown in FIG. 10, in some aspects, process 1000 may include receiving information identifying a shared channel occupancy for a packet transmission resource and a hop counter value associated with the shared channel occupancy (block 1010). For example, the UE (e.g., using antenna 252, demodulator 254, MIMO detector 256, receive processor 258, controller/processor 280, and/or memory 282) may receive information identifying a shared channel occupancy for a packet transmission resource and a hop counter value associated with the shared channel occupancy, as described above.

As further shown in FIG. 10, in some aspects, process 1000 may include determining whether to transmit one or more packets in the shared channel occupancy based at least in part on the hop counter value associated with the shared channel occupancy (block 1020). For example, the UE (e.g., using antenna 252, demodulator 254, MIMO detector 256, receive processor 258, transmit processor 264, TX MIMO processor 266, modulator 254, controller/processor 280, and/or memory 282) may determine whether to transmit one or more packets in the shared channel occupancy based at least in part on the hop counter value associated with the shared channel occupancy, as described above.

Process 1000 may include additional aspects, such as any single aspect or any combination of aspects described below and/or in connection with one or more other processes described elsewhere herein.

With respect to process 1000, in a first aspect, the information identifying the shared channel occupancy and the hop counter value is received in a sidelink transmission from another user equipment.

With respect to process 1000, in a second aspect, alone or in combination with the first aspect, the information identifying the shared channel occupancy and the hop counter value is included in sidelink control information received from another user equipment.

With respect to process 1000, in a third aspect, alone or in combination with one or more of the first and second aspects, determining whether to transmit the one or more packets in the shared channel occupancy comprises determining whether the hop counter value satisfies a threshold, and determining whether to transmit one or more packets in the shared channel occupancy based at least in part on determining whether the hop counter value satisfies the threshold.

With respect to process 1000, in a fourth aspect, alone or in combination with one or more of the first through third aspects, the hop counter value indicates a number of hops between another user equipment from which the information identifying the shared channel occupancy and the hop counter value is received and a first user equipment that initiated the shared channel occupancy.

With respect to process 1000, in a fifth aspect, alone or in combination with one or more of the first through fourth aspects, the threshold corresponds to a maximum number of hops from the first user equipment that initiated the shared channel occupancy.

With respect to process 1000, in a sixth aspect, alone or in combination with one or more of the first through fifth aspects, determining whether the hop counter value satisfies the threshold comprises determining an updated hop counter value that indicates a number of hops between the user equipment and the first user equipment that initiated the shared channel occupancy, and comparing the updated hop counter value with the threshold.

With respect to process 1000, in a seventh aspect, alone or in combination with one or more of the first through sixth aspects, process 1000 includes transmitting the one or more packets in the shared channel occupancy based at least in part on a determination that the hop counter value satisfies the threshold.

With respect to process 1000, in an eighth aspect, alone or in combination with one or more of the first through seventh aspects, process 1000 includes updating the hop counter value by incrementing the hop counter value, resulting in an updated hop counter value, and transmitting information identifying the shared channel occupancy and the updated hop counter value to at least one other user equipment.

With respect to process 1000, in a ninth aspect, alone or in combination with one or more of the first through eighth aspects, the information includes information, received from a first other UE, identifying a first hop counter value and information, received from a second other UE, identifying a second hop counter value, and determining whether to transmit the one or more packets in the shared channel occupancy comprises determining whether to transmit the one or more packets in the shared channel occupancy based at least in part on a smaller one of the first hop counter value or the second hop counter value.

With respect to process 1000, in a tenth aspect, alone or in combination with one or more of the first through ninth aspects, the hop counter value is one of a first value or a second value, and determining whether to transmit the one or more packets in the shared channel occupancy comprises determining to transmit the one or more packets in the shared channel occupancy based in part on determining that the hop counter value is the first value, and determining not to transmit the one or more packets in the shared channel occupancy based in part on determining that the hop counter is the second value.

With respect to process 1000, in an eleventh aspect, alone or in combination with one or more of the first through tenth aspects, the hop counter value is the first value, and further comprising determining a distance between the user equipment and a first user equipment from which the information identifying the shared channel occupancy and the hop counter value is received, setting the hop counter value to one of the first value or the second value based at least in part on the distance between the user equipment and the first user equipment, and transmitting information including the hop counter value set to one of the first value or the second value.

With respect to process 1000, in a twelfth aspect, alone or in combination with one or more of the first through eleventh aspects, setting the hop counter value to one of the first value or the second value based at least in part on the distance between the user equipment and the first user equipment comprises setting the hop counter value to the first value if the distance between the user equipment and the first user equipment satisfies a threshold, and setting the hop counter value to the second value if the distance between the user equipment and the first user equipment does not satisfy the threshold.

With respect to process 1000, in a thirteenth aspect, alone or in combination with one or more of the first through twelfth aspects, determining the distance between the user equipment and a first user equipment comprises determining the distance between the user equipment and the first user equipment based at least in part on position information included in the information received from the first user equipment.

With respect to process 1000, in a fourteenth aspect, alone or in combination with one or more of the first through thirteenth aspects, determining whether to transmit the one or more packets in the shared channel occupancy comprises determining whether to transmit the one or more packets in the shared channel occupancy based at least in part on the hop counter value associated with the shared channel occupancy, and based at least in part on a reference signal received power of a signal used to transmit the information identifying the shared channel occupancy and the hop counter value.

With respect to process 1000, in a fifteenth aspect, alone or in combination with one or more of the first through fourteenth aspects, determining whether to transmit the one or more packets in the shared channel occupancy comprises determining whether to transmit the one or more packets in the shared channel occupancy based at least in part on the hop counter value associated with the shared channel occupancy, and based at least in part on a priority associated with the one or more packets.

With respect to process 1000, in a sixteenth aspect, alone or in combination with one or more of the first through fifteenth aspects, process 1000 includes transmitting the one or more packets with a reduced transmission power based at least in part on a result of determining whether to transmit the one or more packets in the shared channel occupancy.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment, comprising: receiving information identifying a shared channel occupancy for a packet transmission resource and a hop counter value associated with the shared channel occupancy; and determining whether to transmit one or more packets in the shared channel occupancy based at least in part on the hop counter value associated with the shared channel occupancy.

Aspect 2: The method of Aspect 1, wherein the information identifying the shared channel occupancy and the hop counter value is received in a sidelink transmission from another user equipment.

Aspect 3: The method of Aspect 2, wherein the information identifying the shared channel occupancy and the hop counter value is included in sidelink control information received from another user equipment.

Aspect 4: The method of any of Aspects 1-3, wherein determining whether to transmit the one or more packets in the shared channel occupancy comprises: determining whether the hop counter value satisfies a threshold; and determining whether to transmit one or more packets in the shared channel occupancy based at least in part on determining whether the hop counter value satisfies the threshold.

Aspect 5: The method of Aspect 4, wherein the hop counter value indicates a number of hops between another user equipment from which the information identifying the shared channel occupancy and the hop counter value is received and a first user equipment that initiated the shared channel occupancy.

Aspect 6: The method of Aspect 5, wherein the threshold corresponds to a maximum number of hops from the first user equipment that initiated the shared channel occupancy.

Aspect 7: The method of Aspect 6, wherein determining whether the hop counter value satisfies the threshold comprises: determining an updated hop counter value that indicates a number of hops between the user equipment and the first user equipment that initiated the shared channel occupancy; and comparing the updated hop counter value with the threshold.

Aspect 8: The method of any of Aspects 4-7, further comprising: transmitting the one or more packets in the shared channel occupancy based at least in part on a determination that the hop counter value satisfies the threshold.

Aspect 9: The method of Aspect 8, further comprising: updating the hop counter value by incrementing the hop counter value, resulting in an updated hop counter value; and transmitting information identifying the shared channel occupancy and the updated hop counter value to at least one other user equipment.

Aspect 10: The method of any of Aspects 1-9, wherein the information includes information, received from a first other UE, identifying a first hop counter value and information, received from a second other UE, identifying a second hop counter value, and wherein determining whether to transmit the one or more packets in the shared channel occupancy comprises: determining whether to transmit the one or more packets in the shared channel occupancy based at least in part on a smaller one of the first hop counter value or the second hop counter value.

Aspect 11: The method of any of Aspects 1-3, wherein the hop counter value is one of a first value or a second value, and determining whether to transmit the one or more packets in the shared channel occupancy comprises: determining to transmit the one or more packets in the shared channel occupancy based in part on determining that the hop counter value is the first value; and determining not to transmit the one or more packets in the shared channel occupancy based in part on determining that the hop counter is the second value.

Aspect 12: The method of Aspect 11, wherein the hop counter value is the first value, and further comprising: determining a distance between the user equipment and a first user equipment from which the information identifying the shared channel occupancy and the hop counter value is received; setting the hop counter value to one of the first value or the second value based at least in part on the distance between the user equipment and the first user equipment; and transmitting information including the hop counter value set to one of the first value or the second value.

Aspect 13: The method of Aspect 12, wherein setting the hop counter value to one of the first value or the second value based at least in part on the distance between the user equipment and the first user equipment comprises: setting the hop counter value to the first value if the distance between the user equipment and the first user equipment satisfies a threshold; and setting the hop counter value to the second value if the distance between the user equipment and the first user equipment does not satisfy the threshold.

Aspect 14: The method of any of Aspects 12-13, wherein determining the distance between the user equipment and a first user equipment comprises: determining the distance between the user equipment and the first user equipment based at least in part on position information included in the information received from the first user equipment.

Aspect 15: The method of any of Aspects 1-14, wherein determining whether to transmit the one or more packets in the shared channel occupancy comprises: determining whether to transmit the one or more packets in the shared channel occupancy based at least in part on the hop counter value associated with the shared channel occupancy, and based at least in part on a reference signal received power of a signal used to transmit the information identifying the shared channel occupancy and the hop counter value.

Aspect 16: The method of any of Aspects 1-15, wherein determining whether to transmit the one or more packets in the shared channel occupancy comprises: determining whether to transmit the one or more packets in the shared channel occupancy based at least in part on the hop counter value associated with the shared channel occupancy, and based at least in part on a priority associated with the one or more packets.

Aspect 17: The method of any of Aspects 1-16, further comprising: transmitting the one or more packets with a reduced transmission power based at least in part on a result of determining whether to transmit the one or more packets in the shared channel occupancy.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:

a memory; and one or more processors coupled to the memory, the one or more processors configured to:

receive information identifying a shared channel occupancy for a packet transmission resource and a hop counter value associated with the shared channel occupancy, wherein the hop counter value indicates a number of hops between another user equipment from which the information identifying the shared channel occupancy and the hop counter value is received and a first user equipment that initiated the shared channel occupancy; and determine whether to transmit one or more packets in the shared channel occupancy based at least in part on the hop counter value associated with the shared channel occupancy.

2. The user equipment of claim 1, wherein the information identifying the shared channel occupancy and the hop counter value is received in a sidelink transmission from another user equipment.

3. The user equipment of claim 2, wherein the information identifying the shared channel occupancy and the hop counter value is included in sidelink control information received from another user equipment.

4. The user equipment of claim 1, wherein the one or more processors, to determine whether to transmit the one or more packets in the shared channel occupancy, are configured to:

determine whether the hop counter value satisfies a threshold; and determine whether to transmit one or more packets in the shared channel occupancy based at least in part on determining whether the hop counter value satisfies the threshold.

5. The user equipment of claim 4, wherein the threshold corresponds to a maximum number of hops from the first user equipment for which the user equipment may use shared channel resources of the shared channel occupancy.

6. The user equipment of claim 5, wherein the one or more processors, to determine whether the hop counter value satisfies the threshold, are configured to:

determine an updated hop counter value that indicates a number of hops between the user equipment and the first user equipment that initiated the shared channel occupancy; and compare the updated hop counter value with the threshold.

7. The user equipment of claim 4, wherein the one or more processors are further configured to:

transmit the one or more packets in the shared channel occupancy based at least in part on a determination that the hop counter value satisfies the threshold.

8. The user equipment of claim 7, wherein the one or more processors are further configured to:

update the hop counter value by incrementing the hop counter value, resulting in an updated hop counter value; and transmit information identifying the shared channel occupancy and the updated hop counter value to at least one other user equipment.

9. The user equipment of claim 4, wherein the one or more processors are further configured to:

determine a measured channel busy ratio (CBR) corresponding to the shared channel occupancy based on a determination that the hop counter value does not satisfy the threshold; and transmit the one or more packets in the shared channel occupancy based at least in part on a determination that the CBR is less than a CBR threshold for the shared channel occupancy.

10. The user equipment of claim 1, wherein the information includes information, received from a first other UE, identifying a first hop counter value and information, received from a second other UE, identifying a second hop counter value, and wherein the one or more processors, to determine whether to transmit the one or more packets in the shared channel occupancy, are configured to:

determine whether to transmit the one or more packets in the shared channel occupancy based at least in part on a smaller one of the first hop counter value or the second hop counter value.

11. The user equipment of claim 1, wherein the hop counter value is one of a first value or a second value, and wherein when the one or more processors, to determine whether to transmit the one or more packets in the shared channel occupancy, are configured to:

determine to transmit the one or more packets in the shared channel occupancy based in part on determining that the hop counter value is the first value; and determine not to transmit the one or more packets in the shared channel occupancy based in part on determining that the hop counter is the second value.

12. The user equipment of claim 11, wherein the hop counter value is the first value, and wherein the one or more processors are further configured to:

determine a distance between the user equipment and the first user equipment from which the information identifying the shared channel occupancy and the hop counter value is received;

set the hop counter value to one of the first value or the second value based at least in part on the distance between the user equipment and the first user equipment; and transmit information including the hop counter value set to one of the first value or the second value.

13. The user equipment of claim 12, wherein the one or more processors, to set the hop counter value to one of the first value or the second value based at least in part on the distance between the user equipment and the first user equipment, are configured to:

set the hop counter value to the first value if the distance between the user equipment and the first user equipment satisfies a threshold; and set the hop counter value to the second value if the distance between the user equipment and the first user equipment does not satisfy the threshold.

14. The user equipment of claim 12, wherein the one or more processors, to determine the distance between the user equipment and a first user equipment, are configured to:

determine the distance between the user equipment and the first user equipment based at least in part on position information included in the information received from the first user equipment.

15. The user equipment of claim 1, wherein the one or more processors to determine whether to transmit the one or more packets in the shared channel occupancy, are configured to:

determine whether to transmit the one or more packets in the shared channel occupancy based at least in part on the hop counter value associated with the shared channel occupancy, and based at least in part on a reference signal received power of a signal used to transmit the information identifying the shared channel occupancy and the hop counter value.

16. The user equipment of claim 1, wherein the one or more processors to determine whether to transmit the one or more packets in the shared channel occupancy, are configured to:

determine whether to transmit the one or more packets in the shared channel occupancy based at least in part on the hop counter value associated with the shared channel occupancy, and based at least in part on a priority associated with the one or more packets.

17. The user equipment of claim 1, wherein the one or more processors are further configured to:

transmit the one or more packets with a reduced transmission power based at least in part on a result of determining whether to transmit the one or more packets in the shared channel occupancy.

18. A method of wireless communication performed by a user equipment, comprising:

receiving information identifying a shared channel occupancy for a packet transmission resource and a hop counter value associated with the shared channel occupancy, wherein the hop counter value indicates a number of hops between another user equipment from which the information identifying the shared channel occupancy and the hop counter value is received and a first user equipment that initiated the shared channel occupancy; and determining whether to transmit one or more packets in the shared channel occupancy based at least in part on the hop counter value associated with the shared channel occupancy.

19. The method of claim 18,
wherein determining whether to transmit the one or more
packets in the shared channel occupancy comprises:
determining whether the hop counter value satisfies a
threshold; and
determining whether to transmit one or more packets in
the shared channel occupancy based at least in part
on determining whether the hop counter value sat-
isfies the threshold.

20. The method of claim 19,
wherein the threshold corresponds to a maximum number
of hops from the first user equipment for which the user
equipment may use shared channel resources of the
shared channel occupancy, and wherein determining
whether the hop counter value satisfies the threshold
comprises:
determining an updated hop counter value that indi-
cates a number of hops between the user equipment
and the first user equipment that initiated the shared
channel occupancy; and
comparing the updated hop counter value with the
threshold.

21. The method of claim 19, further comprising:
transmitting the one or more packets in the shared channel
occupancy based at least in part on a determination that
the hop counter value satisfies the threshold.

22. The method of claim 21, further comprising:
updating the hop counter value by incrementing the hop
counter value, resulting in an updated hop counter
value; and
transmitting information identifying the shared channel
occupancy and the updated hop counter value to at least
one other user equipment.

23. The method of claim 18,
wherein the information includes information, received
from a first other UE, identifying a first hop counter
value and information, received from a second other
UE, identifying a second hop counter value, and
wherein determining whether to transmit the one or
more packets in the shared channel occupancy com-
prises:
determining whether to transmit the one or more pack-
ets in the shared channel occupancy based at least in
part on a smaller one of the first hop counter value or
the second hop counter value.

24. The method of claim 18,
wherein the hop counter value is one of a first value or a
second value, and determining whether to transmit the
one or more packets in the shared channel occupancy
comprises:
determining to transmit the one or more packets in the
shared channel occupancy based in part on deter-
mining that the hop counter value is the first value;
or
determining not to transmit the one or more packets in
the shared channel occupancy based in part on
determining that the hop counter is the second value.

25. The method of claim 24,
wherein the hop counter value is the first value, and
further comprising:
determining a distance between the user equipment and
the first user equipment from which the information
identifying the shared channel occupancy and the
hop counter value is received;

setting the hop counter value to one of the first value
or the second value based at least in part on the
distance between the user equipment and the first
user equipment; and
transmitting information including the hop counter
value set to one of the first value or the second value.

26. The method of claim 25,
wherein setting the hop counter value to one of the first
value or the second value based at least in part on the
distance between the user equipment and the first user
equipment comprises:
setting the hop counter value to the first value if the
distance between the user equipment and the first
user equipment satisfies a threshold; and
setting the hop counter value to the second value if the
distance between the user equipment and the first
user equipment does not satisfy the threshold.

27. The method of claim 25,
wherein determining the distance between the user equip-
ment and the first user equipment comprises:
determining the distance between the user equipment
and the first user equipment based at least in part on
position information included in the information
received from the first user equipment.

28. The method of claim 18,
wherein determining whether to transmit the one or more
packets in the shared channel occupancy comprises:
determining whether to transmit the one or more pack-
ets in the shared channel occupancy based at least in
part on the hop counter value associated with the
shared channel occupancy, and based at least in part
on at least one of a priority associated with the one
or more packets or a reference signal received power
of a signal used to transmit the information identi-
fying the shared channel occupancy and the hop
counter value.

29. A non-transitory computer-readable medium storing a
set of instructions for wireless communication, the set of
instructions comprising:
one or more instructions that, when executed by one or
more processors of a user equipment, cause the user
equipment to:
receive information identifying a shared channel occu-
pancy for a packet transmission resource and a hop
counter value associated with the shared channel
occupancy, wherein the hop counter value indicates
a number of hops between another user equipment
from which the information identifying the shared
channel occupancy and the hop counter value is
received and a first user equipment that initiated the
shared channel occupancy; and
determine whether to transmit one or more packets in
the shared channel occupancy based at least in part
on the hop counter value associated with the shared
channel occupancy.

30. An apparatus for wireless communication, compris-
ing:
means for receiving information identifying a shared
channel occupancy for a packet transmission resource
and a hop counter value associated with the shared
channel occupancy, wherein the hop counter value
indicates a number of hops between another user equip-
ment from which the information identifying the shared
channel occupancy and the hop counter value is
received and a first user equipment that initiated the
shared channel occupancy; and means for determining whether to transmit one or more packets in the shared channel occupancy based at least in part on the hop counter value associated with the shared channel occupancy.

\* \* \* \* \*